United States Patent
Kwon et al.

[11] Patent Number: 5,885,631
[45] Date of Patent: Mar. 23, 1999

[54] PROCESS OF MANUFACTURING GUM HAVING VARIOUS COLORS AND PATTERNS

[75] Inventors: Ik Boo Kwon, Seoul; Young Youll Chang, Kyang; Eui Sun Lee; Jang Hyuk Ahn, both of Seoul, all of Rep. of Korea

[73] Assignee: Lotte Confectionery Co., Ltd., Seoul, Rep. of Korea

[21] Appl. No.: 913,506

[22] PCT Filed: Aug. 21, 1996

[86] PCT No.: PCT/KR96/00141

§ 371 Date: Sep. 16, 1997

§ 102(e) Date: Sep. 16, 1997

[87] PCT Pub. No.: WO97/25877

PCT Pub. Date: Jul. 24, 1997

[30] Foreign Application Priority Data

Jan. 18, 1996 [KR] Rep. of Korea .................... 1996 1011

[51] Int. Cl.$^6$ ...................................................... A23G 3/00
[52] U.S. Cl. .............................. 426/5; 426/281; 426/249; 426/103
[58] Field of Search .................................. 426/3, 5, 249, 426/103, 279, 281; 425/130, 335, 363, 375

[56] References Cited

U.S. PATENT DOCUMENTS

| | | | |
|---|---|---|---|
| 2,224,430 | 12/1940 | Garbutt | 425/447 |
| 3,632,358 | 1/1972 | Echeandia et al. | 99/135 |
| 4,352,823 | 10/1982 | Cherukuri et al. | 426/5 |
| 4,352,824 | 10/1982 | Puglia et al. | 426/5 |
| 4,399,154 | 8/1983 | Puglia et al. | 426/5 |
| 4,555,407 | 11/1985 | Kramer et al. | 426/5 |
| 4,855,146 | 8/1989 | Murakami et al. | 426/5 |
| 4,940,594 | 7/1990 | Van Alstine | 426/231 |
| 4,954,353 | 9/1990 | Cherukuri et al. | 426/3 |
| 5,019,404 | 5/1991 | Meisner | 426/249 |
| 5,045,325 | 9/1991 | Lesko et al. | 426/5 |
| 5,116,627 | 5/1992 | Rutherford et al. | 426/5 |
| 5,135,760 | 8/1992 | Degady et al. | 426/5 |
| 5,229,148 | 7/1993 | Copper | 426/5 |
| 5,538,742 | 7/1996 | McHale et al. | 426/249 |

FOREIGN PATENT DOCUMENTS

WO94/22323 10/1994 WIPO .

OTHER PUBLICATIONS

Korean Unexamined Publication No. 94–20928 with English Abstract (1994).

*Primary Examiner*—Cynthia L. Nessler
*Attorney, Agent, or Firm*—Finnegan, Henderson, Farabow, Garrett & Dunner, LLP

[57] ABSTRACT

This invention relates to a process of manufacturing gum having various colors and patterns and more particularly, a process of manufacturing the gum product representing fantastic visual effects. In the common process of manufacturing a gum, separately prepared soft gum pieces having various colors and patterns are charged into a hopper, together with powdered sugar and then, by dispersing and rolling the gum pieces on a hard gum sheet, gum pieces are freely adhered to the gum sheet where each part has the different colors and patterns.

2 Claims, 3 Drawing Sheets

PROCESS OF MANUFACTURING GUM HAVING VARIOUS COLORS AND PATTERNS

This application is filed under 35 USC 371 as a national stage application of PCT/KR96/00141, filed Aug. 21, 1996.

BACKGROUND OF THE INVENTION

1. Field of the Invention

This invention relates to a process of manufacturing gum having various colors and patterns and more particularly, a process of manufacturing the gum product representing fantastic visual effects wherein it comprises: In the common process of manufacturing a gum, separately prepared soft gum pieces having various colors and patterns are charged into a hopper, together with powdered sugar and then, by dispersing and rolling the gum pieces on a hard gum sheet, gum pieces are freely adhered to the gum sheet where each part has the different colors and patterns.

2. Description of the Prior Art

The conventional gums have a single color as a whole. Recently, a gum which can provide visual pleasure by printing patterns on a gum using each kind of coloring agents has been developed at home and abroad.

However, a painted-color state is irregular due to physical properties of gum surface. Further, the Korean Unexamined Publication No. 94-20928 discloses a machine for adding food particles to a gum, enabling people to simultaneously enjoy some food while chewing a gum by dispersing food particles like candy on the gum surface when being drawn out on the manufacturing process. But the machine is incongruent for preparing gum having various colors and patterns.

Also, the International Unexamined Patent No. 94-22323 discloses a process of manufacturing a gum having multi-phase structure. FIG. 1 is a schematic view illustrating a process of manufacturing gum pieces from a hopper, as specified in the International Unexamined Patent No. 94-22323.

According to the above method, first gum having colors different from the gum sheet is separately prepared, and then multi-phase gum is prepared by regularly dispersing the gum pieces having specific patterns on the gum sheet by the apparatus attached to a hopper and rolling together with the gum sheet.

However, in the event that the above manufacturing method is applied, there have been some disadvantages in that a) gum production may not be easily made available due to the fact that gum pieces are adhered to the roller instead of gum sheet, and b) prepared multi-phase gum seems to be dull with same pattern and color.

To comply with the above shortcomings, intensive studies have been so far made to invent a process of manufacturing a new gum having more natural and fantastic colors and patterns, together with easily available production.

To prevent the gum pieces from adhering to a roller and for easier adhesion to the gum sheet, their temperature and strength are the most critical factors. Thus this invention has been completed, under the notion that 1) a novel gum having more various colors and patterns may be prepared by dispersing separately prepared gum pieces contained in a hopper, having various colors and shapes, on the gum sheet and rolling together with the gum sheet, and b) in case that the gum pieces having different shapes and colors are folded and rolled among them, more fantastic color and shapes may be noticeable.

SUMMARY OF THE INVENTION

An object of this invention is to provide a process of manufacturing a gum representing fantastic colors and patterns, manufactured by irregularly dispersing separately prepared gum pieces having various colors and shapes under specific temperature and strength with powdered sugar on the gum sheet having relatively lower temperature and hardness and rolling together with the gum sheet.

DETAILED DESCRIPTION OF THE INVENTION

Figure 1B:
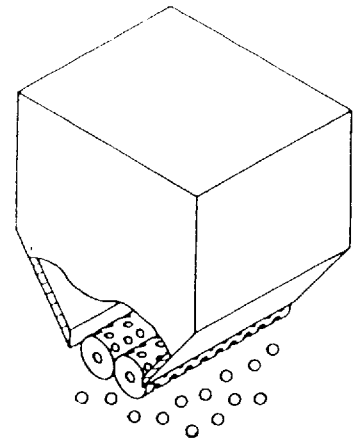
FIG. 1 is a drawing showing the process of dispersing gum pieces prepared by a hopper on the gum sheet according to the International Unexamined Patent No. 94-22323 for the manufacture of a gum.

In line with process of manufacturing a gum with multi-phase structures and patterns, this invention is characterized by a process of manufacturing a gum having various colors and patterns, prepared by dispersing gum pieces at the temperature of 25° to 30° C. and with a strength of 0.3 to 0.4 kg/mm$^2$ (standard of advancing strength level: 0.4 mm) having various colors and shapes on a gum sheet at the temperature 10° to 20° C. and with a strength of 0.6 to 1.6 kg/mm$^2$ (standard of advancing strength level: 0.4 mm), and rolling together the gum pieces with the sheet.

This invention is described in more detail as set forth hereunder.

This invention relates to a gum having various colors and patterns, prepared by dispersing previously prepared gum pieces having various colors and shapes on the gum sheet within specific ranges of both temperature and strength, together with powered sugar and rolling along with the gum sheet. Now that compared to the gum sheet, gum pieces have relatively higher temperature and softness, their easier adhesion with the gum sheet and spreading by a roller may contribute to heightening fantastic visual effects. The manufacturing process is as follows:

First, in case of preparing the gum pieces having various colors according to this invention, 0.1 to 0.5 wt % of sorbitol in common gum composition is contained in proportion to the total gum composition, in order to soften the strength of gum pieces. For example, 15 to 30 wt % of common gum base by mixing polyvinylacetate, wax, emulsifying agent and inorganic filler, 50 to 70 wt % of sugar, 2 to 10 wt % of corn syrup and 0.1 to 0.5 wt % of sorbitol are charged into a mixer preheated to 50° to 60° C. and mixed at below 55° C. After 0.5 to 2.0 wt % of various fruit-taste flavor as a flavor and 0.001 to 0.3 wt % of various coloring agents such as Yellow No. 5, Red No. 2 or sodium copper chlorophylline were added to the above mixer and rolled. Thus gum pieces having various colors and shapes are prepared by cutting the rolled gum. The gum pieces should be kept at 25° to 30° C. and with a strength of 0.3 to 0.4 kg/mm² (standard of advancing strength level: 0.4 mm); if the temperature of gum pieces is less than 25° C. or the strength exceeds the level of 0.4 kg/mm², severely hardened gum pieces prevents the gum pieces from adhering to the gum sheet with merely lodging. Further, if the temperature of gum pieces exceeds 30° C. or the strength is less than 0.3 kg/mm², the gum pieces themselves are adhered altogether or to a roller.

Meantime, in case of preparing the gum sheet as ground gum in such a manner to disperse the above gum pieces, less than 0.1 wt % of sorbitol in common gum composition is contained in proportion to the total gum composition, in order to harden the strength of gum sheet. For example, 15 to 30 wt % of common gum base obtained by mixing polyvinylacetate, wax, emulsifying agent and inorganic filler, 50 to 70 wt % of sugar, 2 to 10 wt % of corn syrup and less than 0.1 wt % of sorbitol are charged into a mixer preheated to 50° to 60° C. and mixed at below 55° C. Then, 0.5 to 2.0 wt % of various fruit-taste flavor as a flavor is added and rolled to manufacture the gum sheet. The temperature and strength of the gum sheet should be maintained at the temperature of 10° to 20° C. and with a strength of 0.6 to 1.6 kg/mm² (standard of advancing strength level: 0.4 mm). If the temperature of the gum sheet is less than 10° C., a harder gum sheet cannot be rolled in the process and a roller is liable to be damaged due to its high rolling pressure required therefrom. Further, in case of exceeding 20° C., the gum pieces are adhered to a roller instead of gum sheet due to its softness. If the strength of a gum sheet is less than 0.6 kg/mm² (standard of advancing strength level: 0.4 mm), there remain some traces in the gum pieces without adhering to a soft gum sheet. Also, if the strength of a gum sheet exceeds 1.6 kg/mm² (standard of advancing strength level: 0.4 mm), a hard gum sheet makes the rolling process impossible.

Then, as illustrated in FIG. 2, the previously prepared gum pieces having various colors and shapes are charged into a hopper, and then they are dispersed on a gum sheet, so formed. This process is described in more detail as follows: The gum pieces having various colors and shapes, which are contained in the hopper, are dispersed on the front part of a spreading plate located at a lower part of the hopper and dispersed gum pieces are evenly distributed on a spreading plate having its own vibrating means and at the same time, evenly dispersed on the gum sheet by utilizing the terminal of slant part of a spreading plate. Hence, to express beautiful colors and patterns of a gum, 10 to 30 wt % of the gum pieces is preferably dispersed in proportion to the gum sheet.

Meantime, the gum pieces charged into a hopper are dispersed on the gum sheet. If the gum pieces are contained to a hopper for lengthy time, gum pieces adhered among them make it rather difficult to disperse them on the gum sheet. To comply with these shortcomings according to this invention, 3 to 7 wt % of powdered sugar in proportion to the gum pieces is charged to a hopper. However, the amounts of powdered sugar are excessive, the gum pieces after rolling process are detached from the gum sheet.

As stated above, manufacturing process of this invention is to provide a gum having various different colors which represent fantastic visual effects, prepared by dispersing the soft gum pieces having relatively high temperature and various colors and patterns on the gum sheet, a ground gum, and rolling together with the gum sheet. Further, to eliminate the sticky phenomena of gum pieces in a hopper, the gum pieces are preserved together with powdered sugar.

This invention may be illustrated in more detail based on the following examples but it is not limited to the examples.

EXAMPLE 1

27 wt % of gum base, 60 wt % of sugar, 2.3 wt % of corn syrup, 9 wt % of glucose, 0.1 wt % of vitamin C, 0.07 wt % of citric acid and 0.3 wt % of sorbitol were charged into a mixer preheated to 65° C. and mixed at below 55° C.

After 1.5 wt % of strawberry-taste flavor as a flavor was added, 0.03 wt % of coloring agent such as Yellow No. 5, Red No. 2 or sodium copper chlorophylline were added to the above mixer, respectively, in order to prepare each different gum having three kinds of color such as orange, red and green. Then, each gum was cut to prepare gum pieces having a granular shape (diameter: 1 to 3 mm).

In the next stage, to prepare a colorless ground gum, 27 wt % of gum base, 60 wt % of sugar, 2.3 wt % of corn syrup, 9 wt % of glucose, 0.1 wt % of vitamin C, 0.07 wt % of citric acid and 0.01 wt % of sorbitol were charged into a mixer preheated to 65° C. and mixed at below 55° C., followed with the addition of 1.53 wt % of strawberry flavor as a flavor.

20 wt % per gum sheet of the prepared gum pieces having granular shape and three colors were dispersed and rolled together to prepare gum having circular pattern of various colors, while maintaining the temperature of gum sheet at 15 to 18° C. and of gum pieces at 25° to 30° C.

EXAMPLE 2

27 wt % of gum base, 60 wt % of sugar, 2.3 wt % of corn syrup, 9 wt % of glucose, 0.1 wt % of vitamin C, 0.097 wt % of citric acid and 0.5 wt % of sorbitol were charged into a mixer preheated to 65° C. and mixed at below 55° C. After 1.5 wt % of strawberry-taste flavor as a flavor was added, 0.003 wt % of coloring agent such as Yellow No. 5, Red No. 2 or sodium copper chlorophylline were added to the above mixer, respectively, in order to prepare each different gum having three kinds of color such as orange, red and green. Then, each gum was cut to prepare gum pieces having a square shape (3 to 5 mm×3 to 5 mm).

In the next stage, to prepare a colorless ground gum, 27 wt % of gum base, 60 wt % of sugar, 2.3 wt % of corn syrup, 9 wt % of glucose, 0.1 wt % of vitamin C, 0.07 wt % of citric acid and 0.007 wt % of sorbitol were charged into a mixer preheated to 65° C. and mixed at below 55° C., followed with the addition of 1.53 wt % of strawberry flavor as a flavor.

20 wt % per ground gum of the prepared gum pieces having square shape and three colors were dispersed and rolled together to prepare the gum having square pattern of various colors, while maintaining the temperature of gum sheet at 15° to 18° C. and of gum pieces at 25° to 30° C.

EXAMPLE 3

27 wt % of gum base, 60 wt % of sugar, 2.3 wt % of corn syrup, 9 wt % of glucose, 0.1 wt % of vitamin C, 0.097 wt % of citric acid and 0.1 wt % of sorbitol were charged into a mixer preheated to 65° C. and mixed at below 55° C.

After 1.5 wt % of strawberry-taste flavor as a flavor was added, 0.003 wt % of coloring agent such as Yellow No. 5, Red No. 2 or sodium copper chlorophylline were added and mixed to the above mixer, respectively, in order to prepare each different gum having three kinds of color such as orange, red and green. Then, each gum was cut to less than 5 mm to prepare gum pieces having various shapes.

In the next stage, to prepare a colorless ground gum, 27 wt % of gum base, 60 wt % of sugar, 2.3 wt % of corn syrup, 9 wt % of glucose, 0.1 wt % of vitamin C, 0.07 wt % of citric acid and 0.09 wt % of sorbitol were charged into a mixer preheated to 65° C. and mixed at below 55° C., followed with the addition of 1.53 wt % of strawberry flavor as a flavor.

20 wt % per ground gum of the prepared gum pieces having various shapes and three colors were dispersed and rolled together to prepare the desired gum product having various colors and patterns, while maintaining the temperature of gum sheet at 15° to 18° C. and of gum pieces at 25° to 30° C.

Experimental Example 1

The same procedure as described in the manufacture of EXAMPLE 1 was used, with the exception that the contents and temperature of sorbitol were different. Some problems of the manufacturing process associated with the temperature and strength related to respectively the gum sheet and gum pieces were assessed and its results are represented in table 1.

TABLE 1

| Gum sheet | | Gum pieces | | | |
|---|---|---|---|---|---|
| Temperature(°C.) | Strength (kg/mm$^2$) | Temperature(°C.) | Strength (kg/mm$^2$) | Occurrence | Evaluation |
| 30 | 0.3 | 30 | 0.3 | Gum pieces are detached from a gum sheet without adherence. | There are some traces of gum pieces on a soft gum sheet. |
| 27.5 | 0.35 | 30 | 0.3 | Gum pieces are detached from a gum sheet without adherence. | There are some traces of gum pieces on a soft gum sheet. |
| 25 | 0.4 | 30 | 0.3 | Gum pieces are detached from a gum sheet without adherence. | There are some traces of gum pieces on a soft gum sheet. |
| 22.5 | 0.5 | 30 | 0.3 | Parts of gum pieces are detached from a gum sheet without adherence. | Parts of gum pieces are adhered to a slightly hard gum sheet. |
| 20 | 0.6 | 30 | 0.3 | Gum pieces are well adhered to a gum sheet. | Spreading gum pieces are well adhered to a hard gum sheet. |
| 20 | 1.5 | 25 | 0.4 | Gum pieces are well adhered to a gum sheet. | Spreading gum pieces are well adhered to a hard gum sheet. |
| 20 | 0.6 | 20 | 0.6 | There are some traces of gum pieces on the gum sheet without adherence. | Gum pieces are not adhered to the gum sheet with some some traces. |

The above table 1 shows that in case that according to the manufacturing process of this invention, the temperature and strength in the gum sheet are maintained at 10° to 20° C. and 0.6 to 1.6 kg/mm$^2$, respectively, and in case of gum pieces at 25° to 30° C. and 0.3 to 0.4 kg/mm$^2$, respectively, the gum pieces are well adhered on a gum sheet in a spreading way. If a gum sheet is high at temperature or soft, the gum pieces have some traces on the gum sheet without adherence. Also, if a gum sheet is low at temperature or hard, the gum pieces have some traces on the gum sheet without adherence.

Experimental Example 2

According to the manufacturing method of this invention, gum pieces contained in a hopper are preserved together with powdered sugar so as to comply with sticky phenomena among gum pieces. To investigate how amounts of powdered sugar affects this invention, a gum was prepared in the same manufacturing process as in said EXAMPLE 4, with the exception that as shown in the following table 2, the contents of powdered sugar were added to a hopper.

TABLE 2

| Amount of powdered sugar | Occurrence |
|---|---|
| 0 wt % | Gum manufacture is not available due to well adhered gum pieces |
| 3 wt % | Unadhered gum pieces themselves are also adhered to a gum sheet |
| 5 wt % | Unadhered gum pieces themselves are adhered to a gum sheet |
| 7 wt % | Unadhered gum pieces themselves are adhered to a gum sheet |

TABLE 2-continued

| Amount of powdered sugar | Occurrence |
|---|---|
| 10 wt % | Unadhered gum pieces themselves are not adhered to a gum sheet. |
| 15 wt % | Unadhered gum pieces themselves are not adhered to a gum sheet. |

Figure 3:
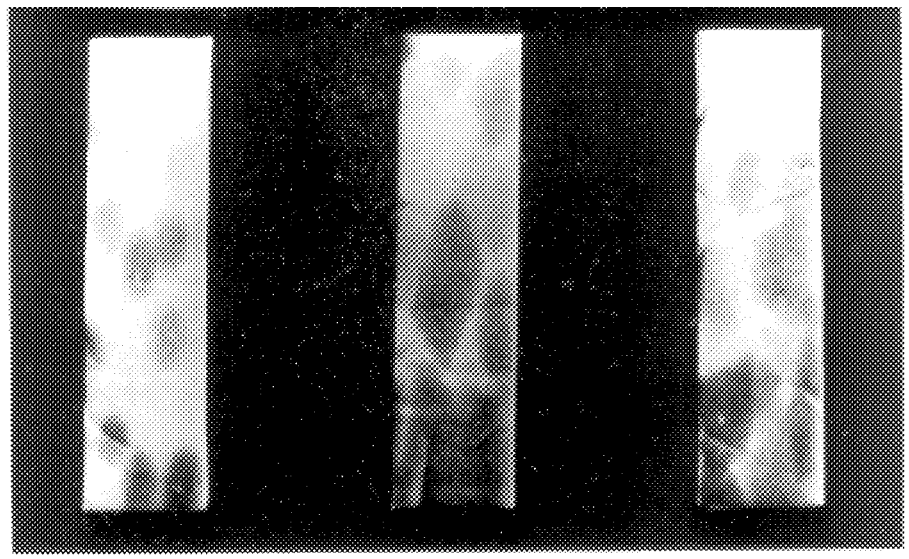
FIG. 3 is a photograph of gum products having various colors and patterns according to this invention, wherein (a) is a photograph of a gum having circular patterns prepared by EXAMPLE 1, (b) is a photograph of a gum having square patterns prepared by EXAMPLE 2, and (c) is a photograph of a gum having various patterns prepared by EXAMPLE 3.

FIG. 3 is a photograph of gum products having various colors and patterns according to this invention, wherein (a) is a photograph of a gum having circular patterns prepared by EXAMPLE 1, (b) is a photograph of a gum having square patterns prepared by EXAMPLE 2, and (c) is a photograph of a gum having various colors and patterns prepared by EXAMPLE 3.

The conventional methods for preparing a gum having various colors and patterns as follows:

a) One method is to roll a gum after adding directly coloring agents to the mixture;

b) The other method is to paint a gum prepared by rolling.

However, in the former case, it is impossible to place the desired patterns having specific colors in suitable position and in the latter case, it is possible to paint the gum having patterns and color as desired but the painting state is very poor.

Further, the International Unexamined Patent No. 94-22323 discloses a simple of rolling two different gums and comprising, fails to settle some problems associated with the rolling process of two different gums, such as sticky phenomena of gum to a roller or non-adherence between gum sheet and gum pieces.

To comply with the aforementioned disadvantages, i.e., a) gum pieces are adhered to a roller, and b) in the rolling process, the surface of gum sheet is hollowed out and poor by gum pieces, the appropriate temperature and strength related to the gum sheet and gum pieces may be maintained through this invention and in the rolling process, soft gum pieces may be spread out on a hard gum sheet, thereby the gum pieces are adhered to a gum sheet in an easier manner. Further, the desired patterns having specific color are located optionally and the gum has beautiful patterns and colors by rolling using gum pieces having each different color and pattern together.

What is claimed is:

1. A method of making a gum having a multi-phased structure and multiple colors comprising dispersing gum pieces having a strength of between 0.3–0.4 $kg/mm^2$ as measured by the standard of 0.4 mm in thickness, a temperature of between 25°–30° C., and various colors and shapes onto a gum sheet having a strength between 0.6–1.6 $kg/mm^2$ as measured by the standard of 0.4 mm in thickness and a temperature of between 10°–20° C., and rolling together the gum pieces with the gum sheet to adhere the gum pieces and the sheet.

2. A process of manufacturing a gum having various colors and patterns according to claim 1, wherein said gum pieces are dispersed in a gum sheet, together with 5 to 7 wt % of powdered sugar.

* * * * *

UNITED STATES PATENT AND TRADEMARK OFFICE
CERTIFICATE OF CORRECTION

PATENT NO. : 5,885,631

DATED : March 23, 1999

INVENTOR(S) : Ik Boo Kwon, et al.

Figure 1A:
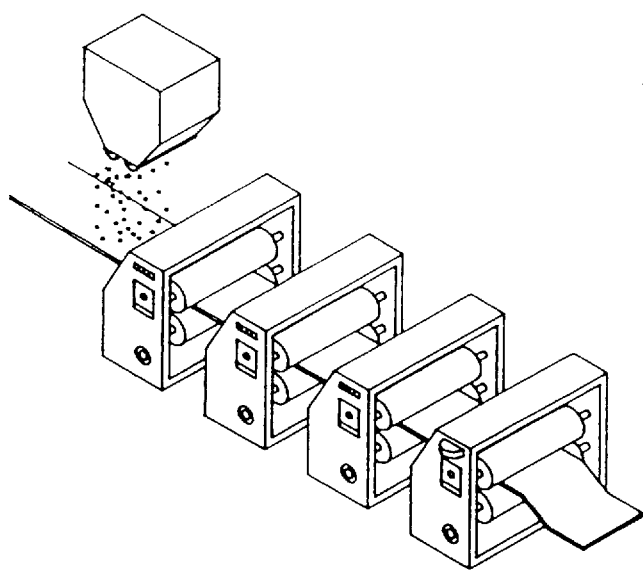

It is certified that error appears in the above-identified patent and that said Letters Patent is hereby corrected as shown below:

Column 2, line 12, change "FIG. 1" to --FIG. 1A--.

Column 2, line 15, after "gum," insert --and FIG. 1B is an enlarged view of the hopper.--

Figures 2A, 2B:
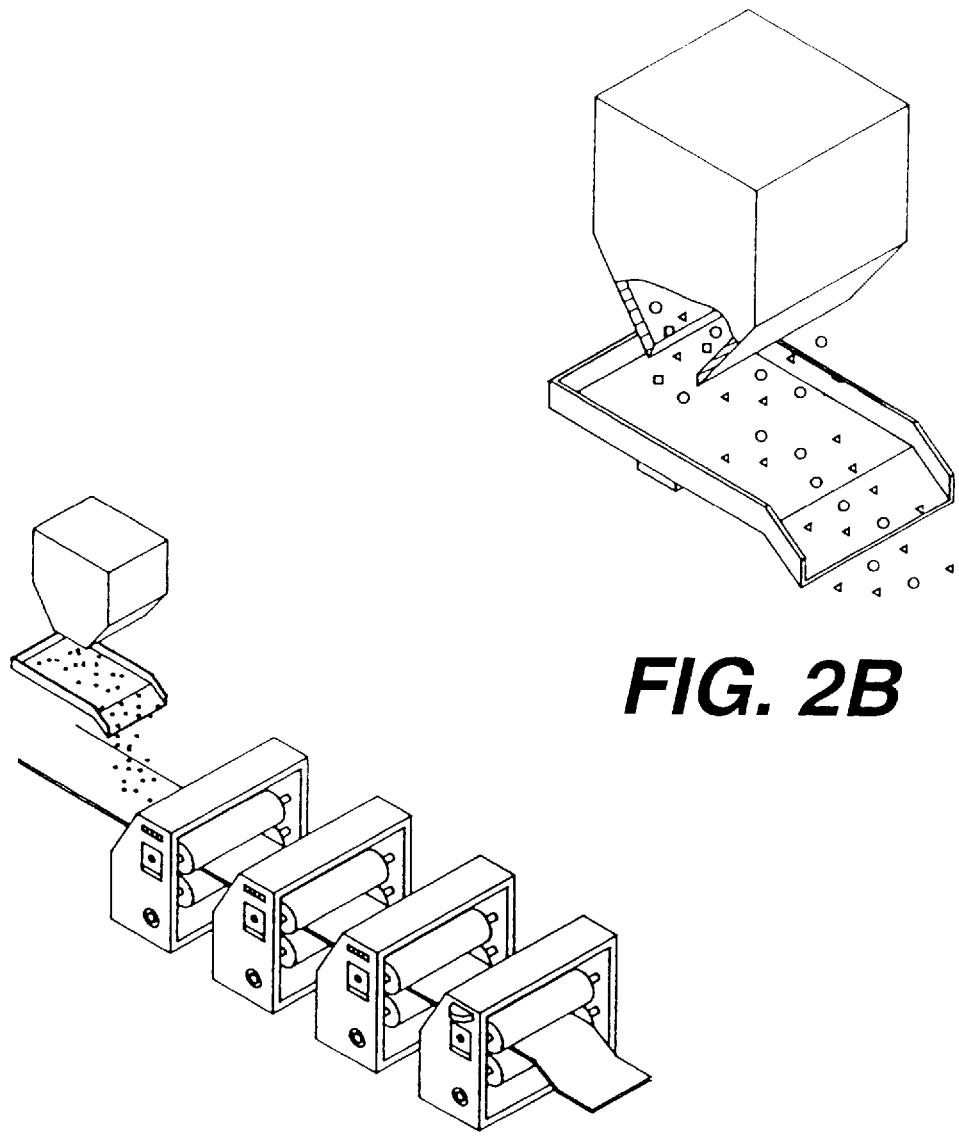
FIG. 2 is a drawing showing the process of dispersing gum pieces having various colors and patterns prepared from a hopper on the gum sheet according to this invention for the manufacture of a gum.

Column 2, line 16, change "FIG. 2" to --FIG. 2A--.

Column 2, line 15, after "gum," insert --and FIG. 2B is an enlarged view of the hopper.--

Column 3, line 36, change "FIG. 2" to --FIG. 2A--.

Signed and Sealed this

Twenty-fourth Day of August, 1999

Attest:

Q. TODD DICKINSON

*Attesting Officer*  *Acting Commissioner of Patents and Trademarks*